Dec. 8, 1931.  W. H. RICE ET AL  1,835,429
HOSE NOZZLE
Filed March 25, 1930
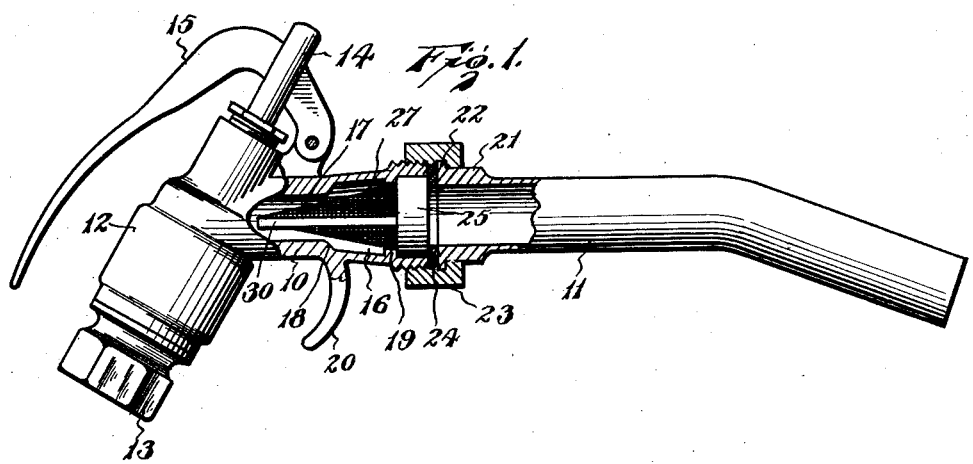
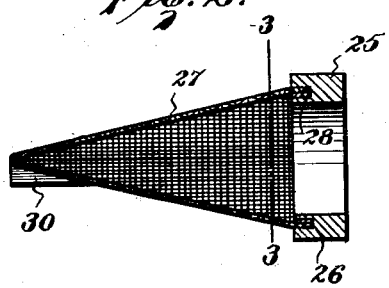
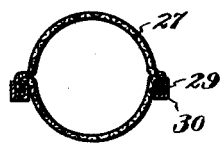
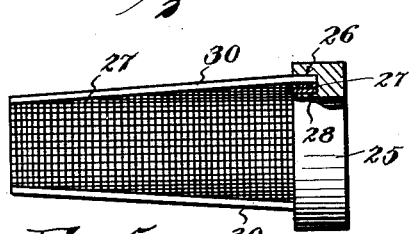
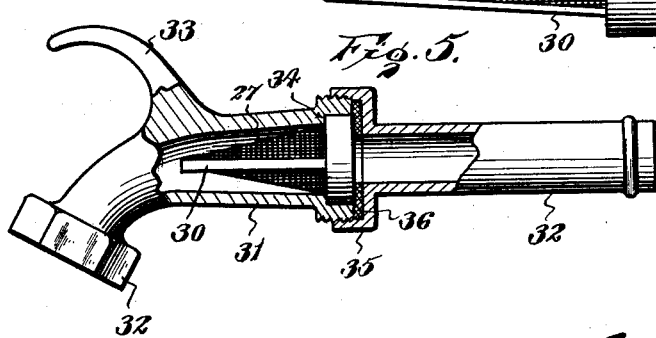
Inventor
W. H. Rice
H. M. Lyon
By Lacey & Lacey, Attorney Patented Dec. 8, 1931

1,835,429

UNITED STATES PATENT OFFICE

WILLIAM H. RICE AND HANCEL M. LYON, OF ATLANTA, GEORGIA

HOSE NOZZLE

Application filed March 25, 1930. Serial No. 438,856.

This invention relates to improvements in nozzles and more particularly to an improved nozzle for the discharge hose of gasoline filing station pumps.

The invention seeks, among other objects, to provide a nozzle employing a strainer cone which is disposed rearwardly in the direction of the source of flow so that filling up and consequent clogging of such strainer is greatly lessened.

Another object of the invention is to provide a device of this character employing a strainer cone which is effectually reinforced against collapse and mutilation.

A further object of the invention is to provide a nozzle having a strainer cone which may be easily removed and cleaned.

And the invention seeks, as a still further object, the provision of a nozzle employing a strainer cone which will effectively remove foreign particles from a motor fuel as it flows through the nozzle, thereby preventing such foreign particles from clogging the gasoline feed pipe line of a motor vehicle.

Other and incidental objects of the invention not mentioned in the foregoing will appear hereinafter.

In the accompanying drawings:

Figure 1 is a side elevation of a valved hose nozzle broken away medially and showing the strainer cone employed in the position therein.

Figure 2 is an enlarged longitudinal sectional view of the strainer cone.

Figure 3 is an enlarged vertical sectional view on the line 3—3 of Figure 2.

Figure 4 is an enlarged side elevation of the strainer cone partly broken away and showing how the reinforcing strips employed are anchored to the ring.

Figure 5 is a side elevation of a valveless nozzle broken away medially and showing the strainer cone in position therein.

The improved hose nozzle forming the subject matter of the present invention includes an inner pipe section 10 and an outer pipe section 11. The inner pipe section provides the outlet for a valve casing 12 which may be of any approved construction and is provided at its lower end with an internally threaded coupling member 13 to which the usual discharge hose of a gasoline supply tank is attached. The valve casing houses a conventional valve mechanism including a reciprocable valve stem 14, and pivoted to coact with said stem is a lever 15 movable at its free end toward the valve casing for depressing the stem and opening the valve, the valve being spring pressed to closed position. Thus, the valve will control the flow of gasoline through the valve casing and through the outlet formed by the pipe section 10. This pipe section is flared at its outer end portion and the wall thereof is reduced in thickness to provide a conical chamber 16 communicating at its smaller end with the bore 17 of the pipe section and, at the inner end of the chamber, the wall thereof is formed with a rounded shoulder 18 which merges gradually into the wall of the bore 17. Formed in the pipe section, at the outer end of the chamber 16, is an annular flange or seat 19 while, at its outer terminal, said pipe section is externally threaded. Depending from the pipe section is a hook 20 by means of which the nozzle may be suspended when not in use.

The pipe section 11 is preferably provided with an angularly disposed outer end portion so as to provide a convenient spout for insertion in the filler necks of gasoline supply tanks of motor vehicles while, at the inner end of said pipe section, the wall thereof is externally thickened to provide a head 21 from which projects an annular flange 22 lying flush with the adjacent end edge of the pipe section. Removably fitting over the pipe section 11 to rotatably coact with the flange 22 is a collar 23 screwed over the outer terminal of the pipe section 10 for detachably connecting the sections with each other. As will be particularly observed, the bore of the pipe section 11 is of less diameter than the bore of the pipe section 10 at its outer end and interposed between the confronting end edges of said pipe sections is an appropriate gasket 24 of leather or the like, clamped between the sections to provide a sealed joint.

Removably received in the pipe section 10 of the nozzle is a strainer, shown in detail in Figures 2, 3 and 4 of the drawings. This strainer includes an end ring 25 having flat end faces, and formed in the inner end face of said ring is an annular groove 26. Seated at its inner end in said groove is a strainer screen 27 and firmly connecting said screen with the ring is a filling 28 of solder closing the groove. The screen 27 is formed from an oblong strip of wire cloth folded medially upon itself and, as particularly brought out in Figure 3, the overlapping side margins of the screen are bent laterally to form flanges 29 extending longitudinally of the screen from end to end thereof. Tightly clamped over these flanges are channel-shaped reinforcing strips 30 of sheet metal. These reinforcing strips thus serve to securely connect the side margins of the screen as well as also close the screen at the sides thereof and, as shown in Figure 4, the strips are fixed at their inner ends in the groove 26 of the end ring 25 so that said strips are thus rigidly supported to reinforce the screen throughout its length. Collapse of the screen will thus be prevented while, also, danger of mutilation of the screen will be greatly lessened. As will be observed, the screen is of substantially conical shape but is flattened at its outer end, due to the folding of the wire cloth, as previously described.

As shown in Figure 1, the strainer is received within the pipe section 10 and attention is directed to the fact that as the shoulder 18 is rounded, the forward ends of the reinforcing strips 30 will not catch against said shoulder as the screen is inserted into the bore of said section. The end ring 25 rests upon the flange 19 for rigidly supporting the screen and, as will be observed, the outer end edge of said ring lies flush with the adjacent end edge of the pipe section 10. Furthermore, as will be observed, the gasket 24 is of a width to overlie the outer end edge of said end ring and, due to the fact that the pipe section 11 is smaller in diameter than the pipe section 10, the inner margin of the gasket is clamped by the pipe section 11 against the outer end edge of the end ring 25 to seal the joint between the strainer and the pipe section 11 as well as the joint between said pipe section and the pipe section 10.

Attention is now directed to the fact that the pointed or smaller end of the strainer is presented rearwardly toward the source of flow of gasoline through the nozzle. Experience has shown that in thus mounting the strainer, clogging of the strainer is reduced to a minimum. However, as will be appreciated, the strainer may, by unscrewing the collar 23, be readily removed, should it become necessary to clean the strainer.

In Figure 5 of the drawings, has been illustrated a slight variation of the invention wherein the nozzle is formed of inner and outer pipe sections 31 and 32, the valve, as illustrated in Figure 1, being omitted. The section 31 is provided with an internally threaded coupling member 32 to which the discharge hose of a gasoline supply tank may be attached and projecting from said section is a hook 33 by which the nozzle may be suspended when not in use. The section is flared toward its forward end and is offset to form an annular shoulder or seat 34 while the adjacent terminal of said section is externally threaded. Integrally formed on the pipe section 32 is a flange or collar 35 which is screwed over the adjacent end of the section 31 for detachably connecting the sections with each other, and interposed between the sections is a gasket 36 like the gasket 24. The end ring 25 of the strainer is snugly received within the forward end of the pipe section 31 to rest against the shoulder 34 and, as will be observed, the gasket 36 overlies the outer end edge of said end ring as in the prior embodiment of the invention. Thus, the strainer is mounted with its smaller end presented to the source of flow of gasoline. In this connection, attention is particularly directed to the fact that as the pipe section 32 is smaller in diameter than the pipe section 31, the screen cannot be mounted with its smaller end projecting within the pipe section 32. Thus, the screen cannot be incorrectly installed. This is also true of the embodiment of the invention shown in Figure 1. However, it is to be noted that the internal diameter of the pipe section 32 in one instance and the pipe section 11 in the other instance, is not smaller than the internal diameter of the end ring 25 of the strainer so that the flow of gasoline through the strainer and through the nozzle will not be hampered.

What is claimed is:

1. In a hose nozzle, a strainer including an end ring, a strainer screen formed from an oblong strip of cloth medially folded transversely upon itself and secured at its ends to said ring, and means securing the longitudinal margins of the cloth together in overlapping relation and closing the screen.

2. In a hose nozzle, a strainer including an end ring, a strainer screen formed from an oblong strip of cloth folded upon itself and secured at its ends to said ring, and means securing the longitudinal margins of the cloth together and closing the screen, said means being anchored to the end ring and reinforcing the screen longitudinally at opposite sides thereof.

3. A hose nozzle including detachably connected pipe sections, a substantially conical wire screen removably carried in one of said pipe sections and having its small end disposed inwardly toward the source of flow of a fluid passing through said nozzle whereby clogging of said screen and consequent retarding of the flow will be reduced to a minimum, one of said pipe sections being too small to accommodate the screen, said screen including a ring normally lying in said larger pipe section and being formed of a strip of wire cloth folded upon itself and secured at its free end margins to the ring for defining a wedge-shaped end for the screen, and means securing the corresponding side margins of the screen together.

4. In a hose nozzle, a strainer embodying a ring having an annular groove, a strip of wire cloth folded upon itself medially to form a closed outer end for said strainer, said strip having its free end margins fixed in overlapping relation to the ring and within the groove, and channel shaped reinforcing strips connecting the side margins of the screen and closing the sides thereof, said reinforcing strips having their inner ends fixed within the groove and tending to prevent mutilation of said screen.

In testimony whereof we affix our signatures.

WILLIAM H. RICE. [L. S.]
HANCEL M. LYON. [L. S.]